(12) United States Patent
Jeffers

(10) Patent No.: US 6,549,368 B1
(45) Date of Patent: Apr. 15, 2003

(54) SEGMENTED PLATE HUB HOLD DOWN SYSTEM FOR RECORDING MEDIUM

(75) Inventor: Frederick Jeffers, Escondido, CA (US)

(73) Assignee: Iomega Corporation, UT (US)

(*) Notice: Subject to any disclaimer, the term of this patent is extended or adjusted under 35 U.S.C. 154(b) by 0 days.

(21) Appl. No.: 09/325,992

(22) Filed: Jun. 4, 1999

(51) Int. Cl.[7] .............................................. G11B 17/022
(52) U.S. Cl. .................................................... 360/99.08
(58) Field of Search .......................... 360/99.05, 99.02, 360/99.03, 99.04, 99.12, 99.08, 132, 133, 98.08, 123, 97.01; 369/264, 271

(56) References Cited

U.S. PATENT DOCUMENTS

| | | | |
|---|---|---|---|
| 5,398,141 A | * 3/1995 | Tannert | 360/123 |
| 5,715,115 A | * 2/1998 | Takarasawa et al. | 360/99.05 |
| 5,761,186 A | * 6/1998 | Mushika et al. | 369/271 |
| 5,793,740 A | * 8/1998 | Nguyen | 369/264 |
| 6,069,766 A | * 5/2000 | Battue et al. | 360/97.01 |

* cited by examiner

Primary Examiner—William Klimowicz
Assistant Examiner—Tianjie Chen
(74) Attorney, Agent, or Firm—Woodcock Washburn LLP

(57) ABSTRACT

A magnetic hubbing assembly for engaging and rotating the hub of a removable recording medium has a segmented hub and a hubbing magnet including four or more poles. The hubbing magnet is ring-shaped and the hub is a high permeability SiFe metal. Segments of the hub are equal in number to the number of poles of the magnet.

8 Claims, 4 Drawing Sheets

SEGMENTED PLATE HUB HOLD DOWN SYSTEM FOR RECORDING MEDIUM

BACKGROUND OF THE INVENTION

1. Field of the Invention

The present invention relates to a mechanism for holding the hub of a removable disk cartridge to the spindle motor of a disk drive.

2. Description of the Prior Art

Removable disk cartridges for storing digital electronic information typically comprise an outer casing or shell that house one or more rotatable storage media, or disks, upon which electronic information can be stored. The cartridge shell often comprises upper and lower halves that are joined together to house the disk(s). The disk(s) is mounted on a hub assembly that rotates freely within the cartridge. The outer shell of the cartridge typically has some form of opening near its forward edge to provide the recording heads of the drive with access to the recording surfaces of the disk. A shutter or door mechanism is provided to cover the opening when the cartridge is not in use to prevent dust or other contaminants from entering the cartridge and settling on the recording surface of the disk.

When the cartridge is inserted into a data storage device, i.e., disk drive, a spindle motor in the drive engages the hub assembly through an opening in the bottom shell of the disk cartridge in order to rotate the disk within the cartridge. In many prior art removable cartridge disk drive systems, a center spindle on the motor engages a hub assembly. A chucking magnet in the spindle and/or hub assembly provides sufficient force to keep the hub assembly engaged on the spindle motor during rotation. Magnetic chucking provides sufficient engagement in most disk drives that operate at lower rotations speeds, as well as in most disk drive units that are internally mounted in a computer casing.

A locking mechanism such as that described in U.S. Pat. No. 5,757,584, Schick, is sometimes provided to lock the disk cartridge hub to the spindle motor. However, the magnetic chucking assembly may be useful to hold the cartridge to the spindle motor until the locking mechanism is engaged. (This patent shows a drive of the type commonly referred to as JAZ).

U.S. Pat. Nos. 5,617,397 and 5,805,555, Jones et al. show a cartridge of the type commonly referred to as the ZIP cartridge and a drive for use with that cartridge. The ZIP drives such as that disclosed in the aforementioned patents have a four pole magnet made from a high energy. NdFeB material with a solid stainless steel hub. The tangential holding force is adequate, but it is desirable to increase the tangential holding force without increasing the vertical holding force. An increase in vertical holding force would cause dehubbing problems that might possibly occur with a larger vertical force. This invention solves the problem.

U.S. Pat. No. 6,043,945 Muse, et al shows a cartridge and drive of the type commonly referred to as Clik! This patent is incorporated by reference herein.

An object of the present invention is to increase the tangential holding force between the magnet and the hub, without increasing the vertical holding force. A further object of the present invention is to provide a more durable magnet material than the bare sintered magnet which may abrade in use. Another objective of the invention is to reduce the expense of the hold down magnet.

SUMMARY OF THE INVENTION

In accordance with the present invention a larger tangential holding force is obtained in a hubbing mechanism by using a magnet with multiple poles and a hub which is segmented to match the number of poles in the magnet. More specifically, the hub is cut in the form of a "radial comb" which has strips or segments cut out of it. The tangential force between the metal comb and the magnet has a pronounced ratchet effect when the comb is moved over the magnet. The tangential force is much larger when the metal strips lie over a magnetized region in the magnet. The magnetic force is smaller when the strips are over a transition in the pattern recorded in the magnet. It has been found that a segmented hub in accordance with the present invention provides significantly greater tangential force per unit area than a solid hub.

In accordance with the present invention a larger tangential force is obtained by using a magnet with multiple poles, and segmenting the hub to match the number of poles in the magnet. The vertical force holding force is not increased.

The foregoing and other objects, features and advantages of the invention will be better understood from the following more detailed description and appended claims.

SHORT DESCRIPTION OF THE DRAWINGS

DETAILED DESCRIPTION OF THE PREFERRED EMBODIMENT

Figure 1:
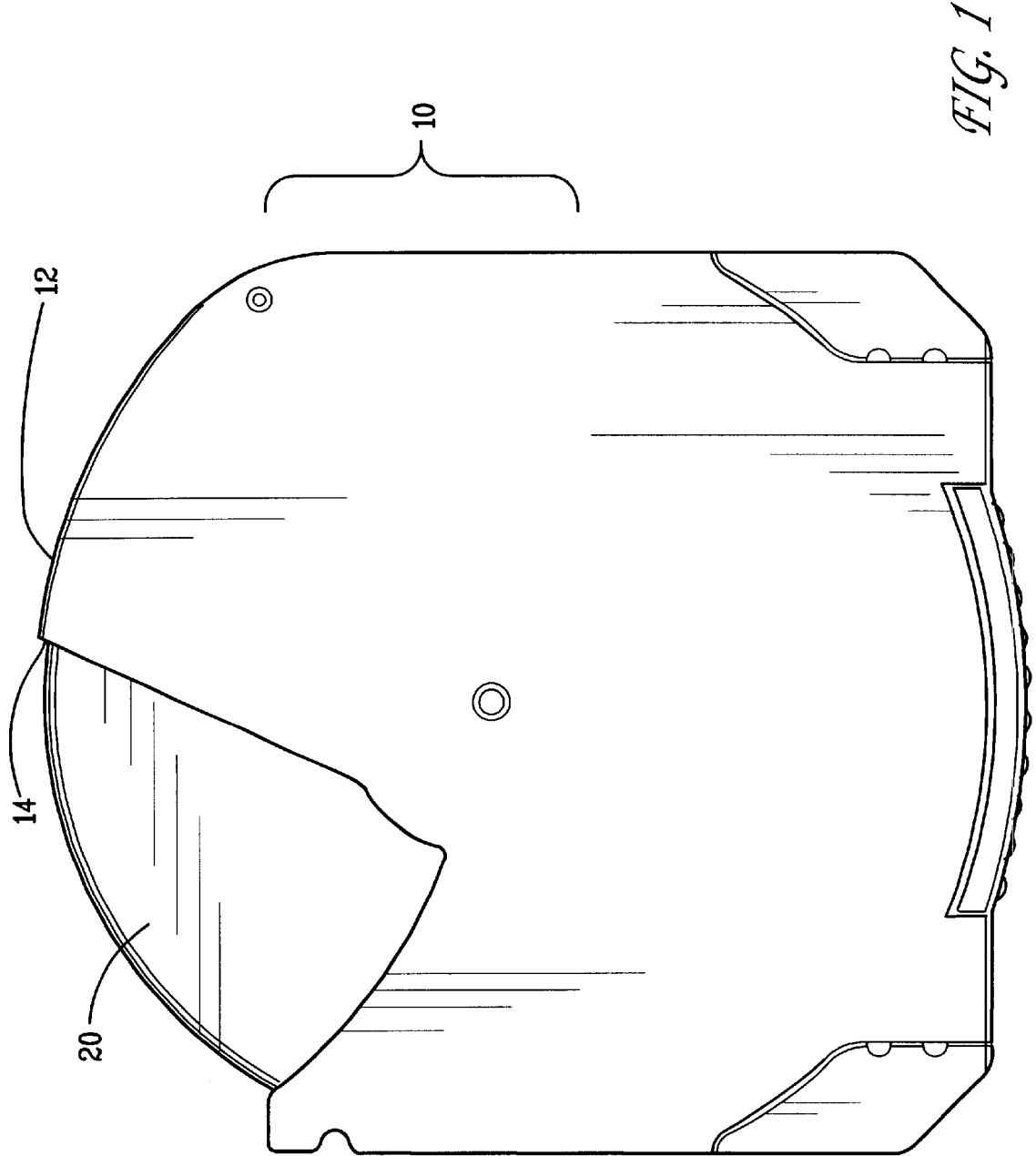
FIG. 1 is a disk cartridge in accordance with a preferred embodiment of the invention.
Figure 2:
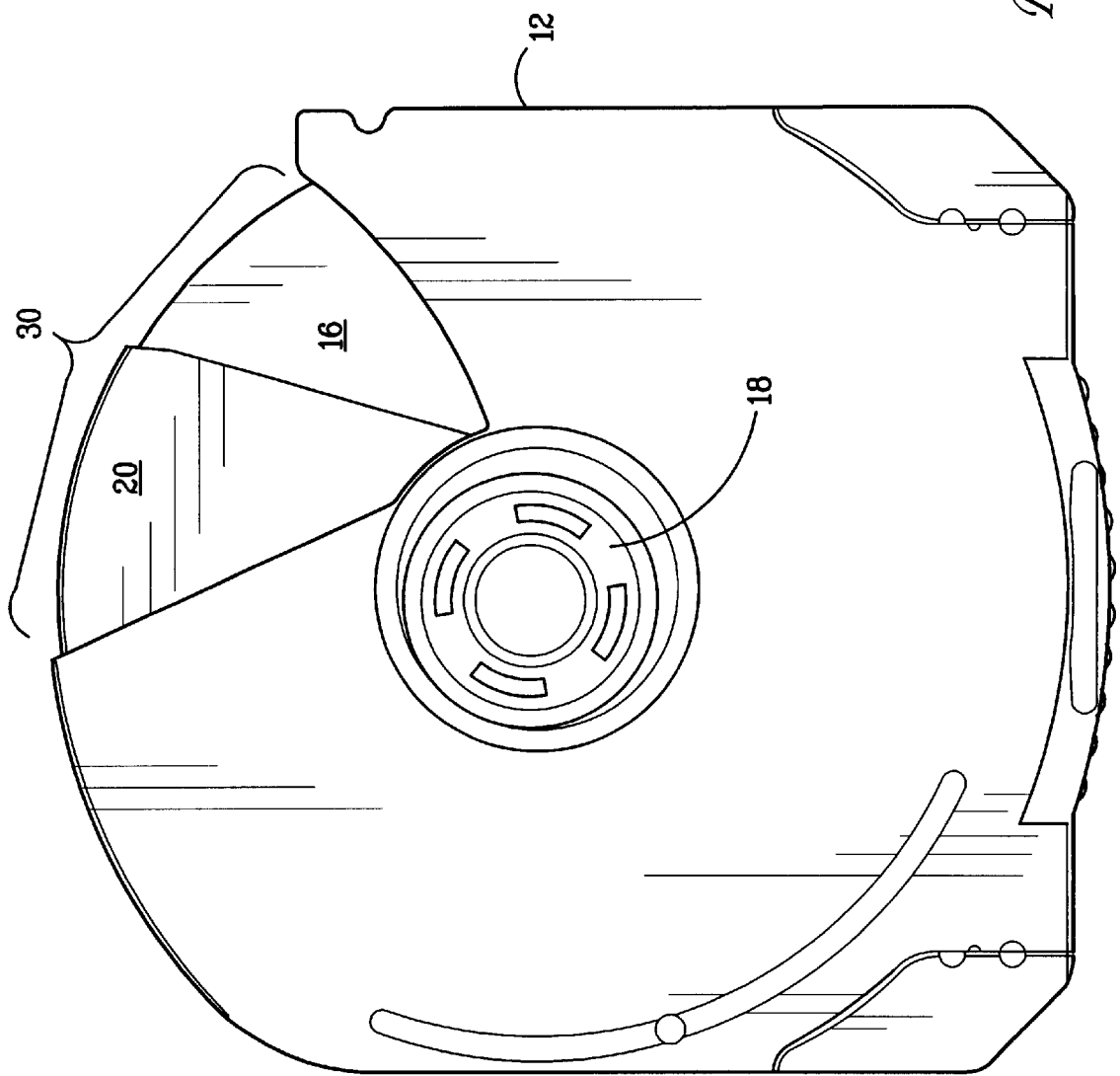
FIG. 2 is a bottom view of the disk cartridge of FIG. 1.

Referring to the drawings, wherein like numerals indicate like components throughout, there is shown in FIGS. 1 and 2 an exemplary disk cartridge 10 adapted for use in the disk drive apparatus of the present invention. As shown, the disk cartridge 10 includes an outer casing 12 with a head access opening 14.

A disk-shaped information storage medium 16 is affixed to a hub 18 that is rotatably mounted in the casing 12. The storage medium comprises a flexible magnetic storage medium, however, in other embodiments, the disk may comprise a rigid magnetic disk, a magneto-optical disk or an optical storage medium. Head access opening 14 in the peripheral edge 20 of the disk cartridge 10 provides access to the surfaces of the storage medium by the read/write heads of the disk drive apparatus.

A shutter 20 is provided on the front peripheral edge of the disk cartridge 10 to cover the head access opening 14 when the cartridge is not in use. When the cartridge is inserted into the disk drive apparatus, the shutter 26 moves to the side exposing the head access opening 14 qnd thereby providing the read/write heads of the drive with access to the storage medium.

Figure 3:
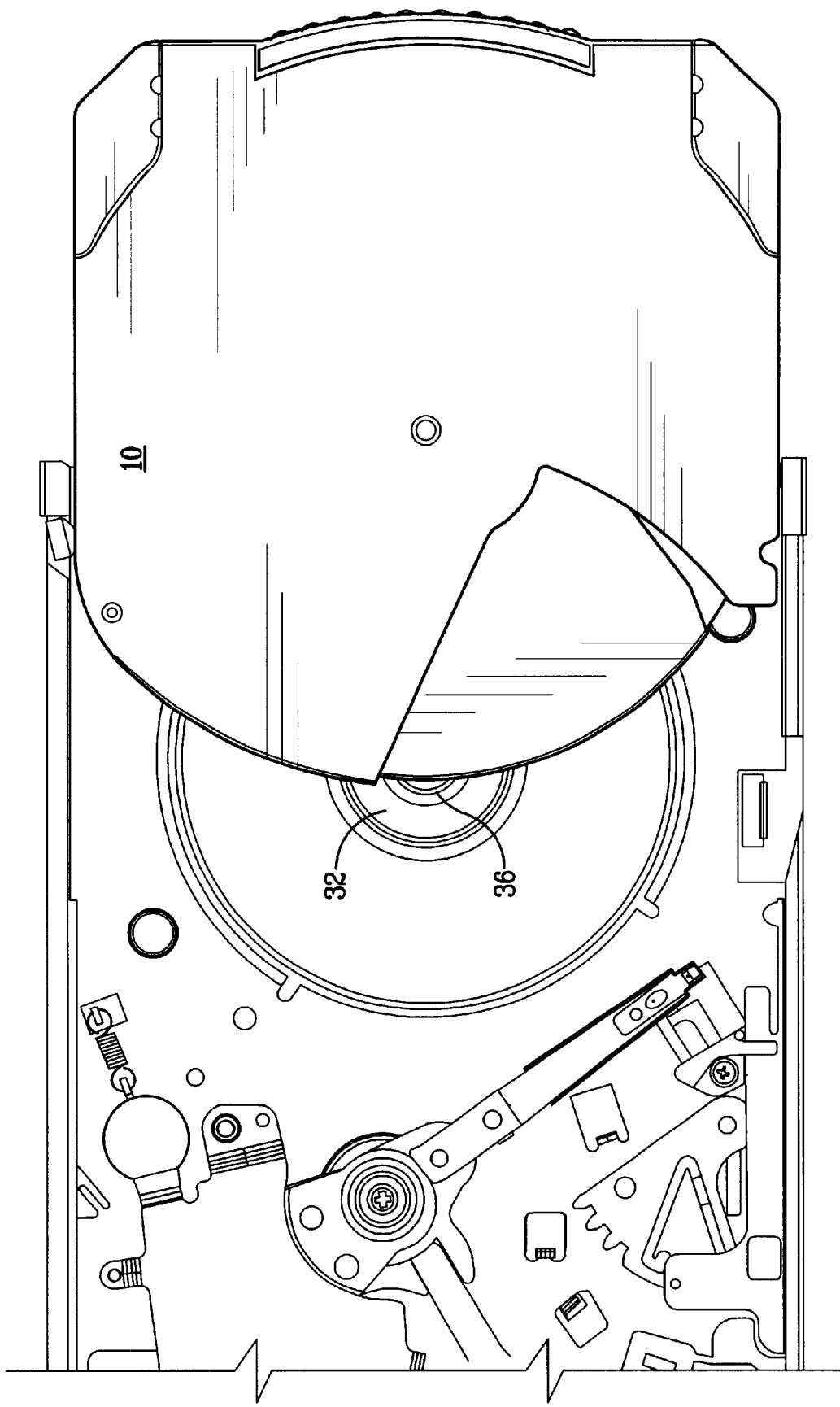
FIG. 3 shows the disk drive.

FIG. 3 is a top view of a disk drive according to a preferred embodiment of the present invention, showing the disk cartridge 10 being inserted into the drive. FIG. 3 shows the cartridge at an initial stage of insertion. FIG. 3 is similar to FIG. 3A of U.S. patent Ser. No. 08/920,935, Muse, et al, now U.S. Pat. No. 6,043,954, which is incorporated herein by reference.

When the cartridge is fully inserted, the spindle motor 32 engages the hub 18 of the disk cartridge.

Figure 5:
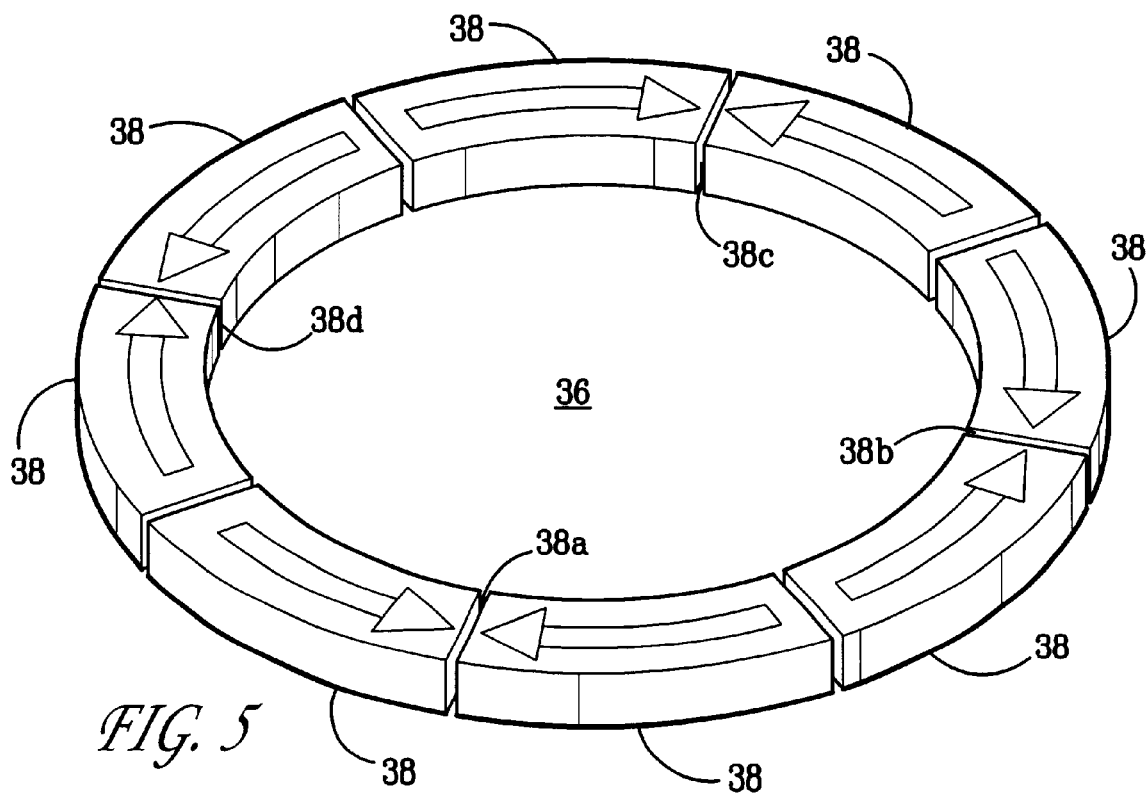
FIG. 5 shows the spindle motor hub engaging magnet of the present invention in more detail.

The disk is rotated by the spindle motor 32 which has a hub engaging member 36 which shown in more detail in FIG. 5.

Figure 4:
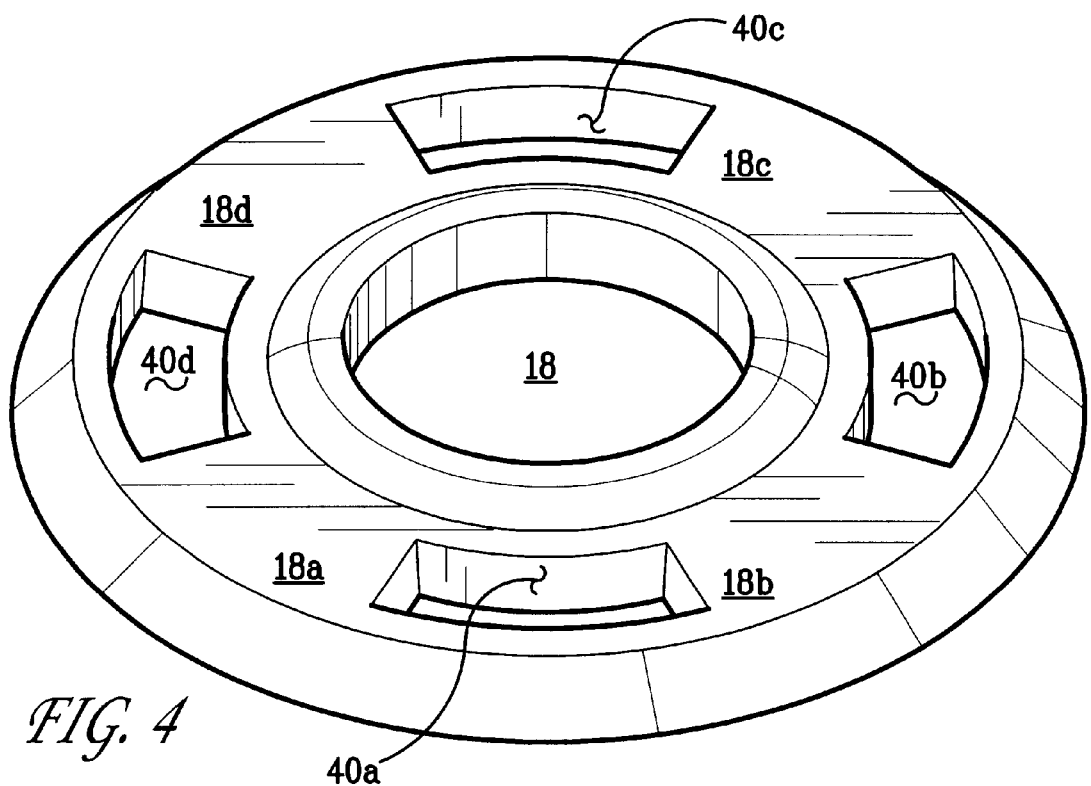
FIG. 4 is a perspective view of the hub of the disk cartridge of FIG. 1 and 2.

Read/write heads 34 engage the disk in the cartridge to read/write data as the disk is rotated. The hub 18 of the cartridge shown in FIG. 4 has a pattern which matches the pattern of the poles of the magnets of the hub engaging member 36. The hub 18 of FIG. 4 has slots 40a–40d which segment it with a pattern which matches the pattern of the poles of the magnets. The hub 18 is segmented with a pattern of four segments 18a–18d which matches the poles of the magnets 38 in FIG. 5. The hub engaging member 36 has eight magnets 38. The poles of the magnets 38 have a pattern which matches the segmented hub 18 in FIG. 4. The member 18 is cut into four segments equal in number to the four poles formed by the magnets 38.

The tangential holding force is increased significantly by the segmented hub of the present invention. The tangential holding force of the hubbing mechanism of a conventional drive cartridge is the magnetic vertical force times the coefficient of friction between the hub and the magnet. The metal-to-metal coefficient of friction is rather low, hence the tangential force is small, in spite of the large vertical holding force generated by the strong NdFeB magnet.

To demonstrate the effect of the present invention, a 66-mil-thick-rubber magnet was used. It is the type of magnet which is commonly used as a "refrigerator" magnet. It has a pattern of eight poles to the inch. The magnet was coated with a layer of Teflon adhesive tape to give a low coefficient of friction to mimic that in a disk drive. A piece of 28-mil-thick-high-permeability SiFe transformer metal was cut in the form of a "comb", wherein 1/8 inch by 11/16 inch strips were removed. The tangential force between the metal comb and the magnet has a a very pronounced "ratchet effect" when the comb is moved over the magnet. What is happening is that the tangential force is much larger when the metal strips are over a magnetized region in the magnet. The magnetic force is much smaller when the strips are over a "transition" in the pattern recorded in the magnet.

A simple experiment was done to estimate the relative tangential forces of the segmented plates and a similar solid plate. Both plates were put on the magnet at the same time, and moved parallel to the surface in opposite directions. The relative areas of contact were varied until both plates would just slide. The result is that, for this combination of components, the segmented plate has about 1.5× more tangential force per unit area than the solid plate. Paradoxically, half of the metal was removed, and the tangential force went up by a factor of 1.5×!

While particular embodiments have been shown and described various modifications may be made. The appended claims are, therefore, intended to cover all embodiments within the true spirit and scope of the invention.

What is claimed is:

1. A magnetic hubbing assembly for engaging and rotating a removable recording medium comprising:

a spindle motor having a hub engaging member; and a disk hub disposed proximate a center of the removable recording medium and securely coupled thereto, one of said member and said hub having magnets with four or more poles, said magnets being arranged by south polarization to south polarization and north polarization to north polarization of adjacent magnets;

the other of said member and said hub having segments which are separated one from the other by air with a pattern which matches the pattern of the poles of said magnets, the number of said segments being equal to the number of poles of said magnets.

2. The hubbing assembly recited in claim 1 wherein said hub engaging member is a multiple pole magnet.

3. The hubbing assembly recited in claim 2 wherein said hub is a ferromagnetic material cut into said segments.

4. The hubbing assembly recited in claim 3 wherein said ferromagnetic material is high permeability stainless steel.

5. The hubbing assembly recited in claim 2 wherein said hub is cut into a plurality of segments equal in number to the number of poles of said magnets.

6. The hubbing assembly recited in claim 1 wherein said magnets are ring shaped.

7. A magnetic hubbing assembly for engaging and rotating a removable recording medium comprising:

a spindle motor having a hub engaging member, said hub engaging member being a multiple pole magnet with four or more poles, said magnets being arranged by south polarization to south polarization and north polarization to north polarization of adjacent magnets;

a disk hub disposed proximate a center of said removable recording medium and securely coupled thereto, said hub having segments which are separated one from the other by air with a pattern which matches the pattern of the poles of said magnets, the number of said segments being equal to the number of said poles of said magnets.

8. The magnetic hubbing assembly recited in claim 7 wherein said magnets are ringed shaped.

* * * * *